US011516619B2

United States Patent
Tumuluru et al.

(10) Patent No.: US 11,516,619 B2
(45) Date of Patent: Nov. 29, 2022

(54) GENERATING POINT OF INTEREST FOR LOCATION ORIENTATION

(71) Applicant: Uber Technologies, Inc., San Francisco, CA (US)

(72) Inventors: Anand Karthik Tumuluru, San Francisco, CA (US); Thomas Matthew Hirschfeld, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 55 days.

(21) Appl. No.: 17/301,584

(22) Filed: Apr. 8, 2021

(65) Prior Publication Data

US 2021/0337343 A1    Oct. 28, 2021

Related U.S. Application Data

(60) Provisional application No. 63/016,669, filed on Apr. 28, 2020.

(51) Int. Cl.
*H04W 4/021*    (2018.01)
*H04W 4/02*    (2018.01)
*G06F 16/29*    (2019.01)

(52) U.S. Cl.
CPC ............ *H04W 4/021* (2013.01); *G06F 16/29* (2019.01); *H04W 4/025* (2013.01)

(58) Field of Classification Search
CPC ....... H04W 4/021; H04W 4/025; G06F 16/29; G06F 16/909
See application file for complete search history.

(56) References Cited

U.S. PATENT DOCUMENTS

| 10,198,707 B1* | 2/2019 | Bolton | G06Q 10/0835 |
| 10,495,479 B1* | 12/2019 | Kahn | G01C 21/3673 |
| 2018/0014161 A1* | 1/2018 | Warren | G06F 16/24578 |

OTHER PUBLICATIONS

Fonti, Roberto, "Reverse Geocoding System", U.S. Appl. No. 16/161,838, filed Oct. 16, 2018, 46 pgs.
Tumuluru, Anand Karthik, "Suggesting Pickup Locations for Transport Service Coordination", U.S. Appl. No. 16/234,281, filed Dec. 27, 2018, 54 pgs.

* cited by examiner

*Primary Examiner* — Minjung Kim
(74) *Attorney, Agent, or Firm* — Schwegman Lundberg & Woessner, P.A.

(57) ABSTRACT

Systems and methods are provided for determining a street and segment corresponding to the geographic coordinates for a location and determining a heading and a side of the street for the location. The system and methods further provide for generating a list of places within a predetermined distance from the location, determining a first subset of places of the list of places that are located on the same street as the street corresponding to the geographic coordinates for the location, and generating a second subset of places from the first subset of places, each place of the second subset of places having a same heading and side of the street as the heading and side of the street for the location. The systems and methods further provide for selecting a place of the second subset of places and generating a semantic label for the selected place.

20 Claims, 8 Drawing Sheets

GENERATING POINT OF INTEREST FOR LOCATION ORIENTATION

CLAIM FOR PRIORITY

This application claims the benefit of priority of U.S. Application Ser. No. 63/016,669, filed Apr. 28, 2020, which is hereby incorporated by reference in its entirety.

BACKGROUND

If given geographic coordinates (e.g., latitude and longitude) for a location, the latitude and longitude can be translated into an address, such as 123 Main Street. In many situations, however, the physical address alone may not be very useful. For example, a user may be using a ride service application and need to know where to meet the driver or other passengers for the ride. A user may not be familiar with the area or may not know a specific street or address and thus, simply providing an address alone may not be very helpful.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to generating a point of interest for location orientation. As explained above, a physical address alone may not be very useful in various scenarios. For instance, a physical address may be for a building that spans an entire block. In a ride sharing situation, it is not clear to a driver or a rider where on the block he or she should meet just based on the address. Moreover, a rider may request a ride when he or she is still in a building, which indicates a geographical location in a middle of a building and not on any particular street. Also, there are many countries, such as India and Egypt, that do not use physical addresses. Further, geographic coordinates may not be perfectly accurate to pinpoint an exact location of a user associated with a device, which causes confusion when a driver arrives at an address and a rider is not there or when a rider is waiting at an address and a driver indicates that he or she has arrived but it is not at a location of the rider, for example.

Figure 1:
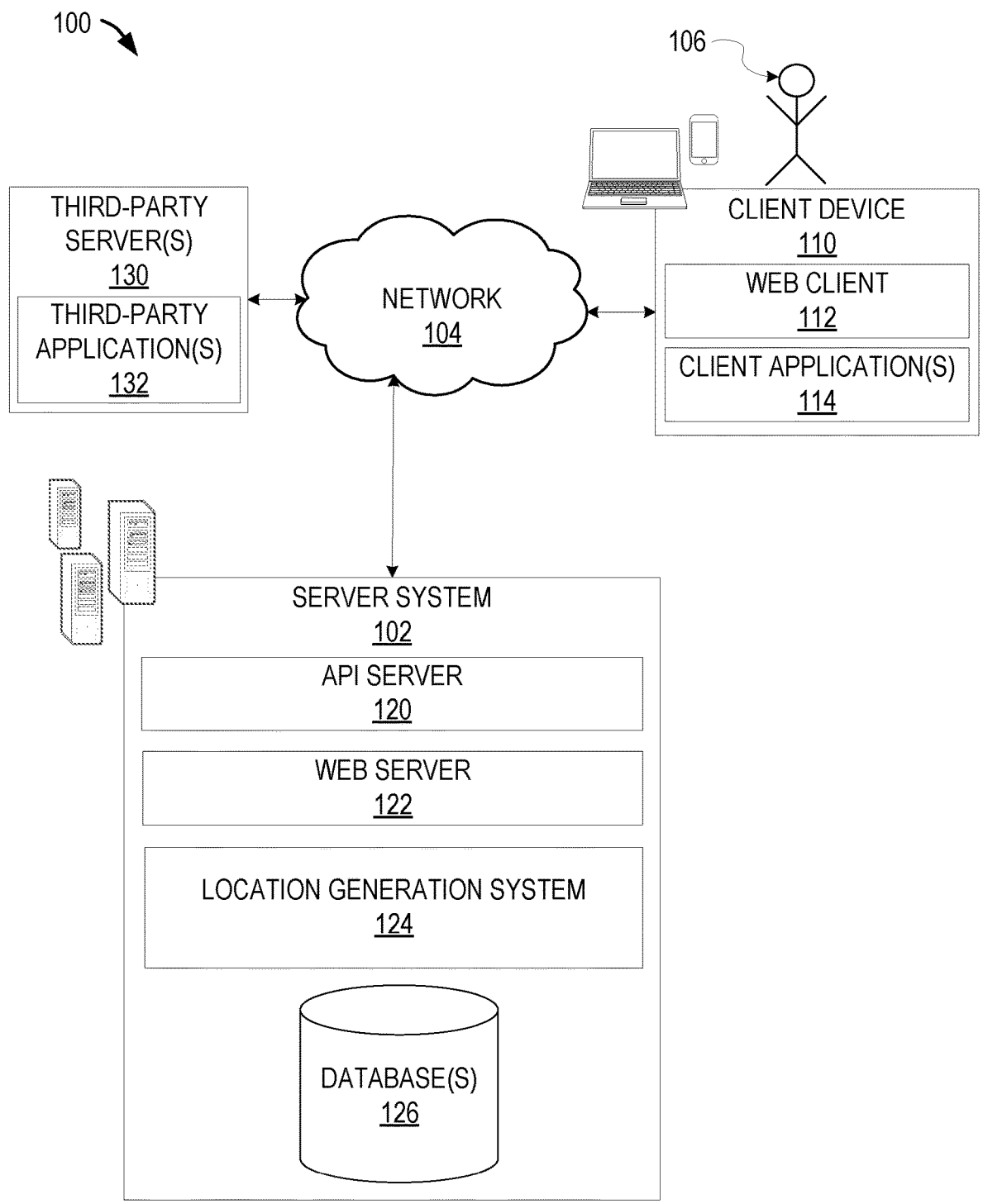
FIG. 1 is a block diagram illustrating a networked system, according to some example embodiments.

Example embodiments provide for determining a landmark or other point of interest that can be used to identify a location for pickup, drop-off, delivery, meeting up, or other scenario where a clearly identified location is desired. The landmark or other point of interest is used to create a semantic label to provide for a location. For example, in example embodiments a computing system determines a street and segment corresponding to geographic coordinates for a location and determines a heading and a side of the street for the location. The computing system further generates a list of places within a predetermined distance from the location, determines a first subset of places of the list of places that are located on the same street as the street corresponding to the geographic coordinates for the location, and generates a second subset of places from the first subset of places, each place of the second subset of places having a same heading and side of the street as the heading and side of the street for the location. The computing system further selects a place from the second subset of places and generates a semantic label for the selected place FIG. 1 is a block diagram illustrating a networked system 100, according to some example embodiments. The system 100 includes one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touchscreens, accelerometers, gyroscopes, cameras, microphones, GPS devices, IMUS, and so forth. The client device 110 may be a device of a user that is used to request map information, provide map information, request navigation information, receive and display results of map and/or navigation information, request data about a place or entity in a particular location, receive and display data about a place or entity in a particular location, receive and display data about a pickup or drop-off location, receive and display data related to navigation to a pickup or drop-off location, and so forth.

One or more users 106 may be a person, a machine, or other means of interacting with the client device 110. In example embodiments, the user 106 is not part of the system 100 but interacts with the system 100 via the client device 110 or other means. For instance, the user 106 provides input (e.g., touchscreen input or alphanumeric input) to the client device 110 and the input may be communicated to other entities in the system 100 (e.g., third-party servers 130, server system 102) via a network 104. In this instance, the other entities in the system 100, in response to receiving the input from the user 106, communicate information to the client device 110 via the network 104 to be presented to the user 106. In this way, the user 106 interacts with the various entities in the system 100 using the client device 110. In some example embodiments, the user 106 is a rider in a ride-sharing service, a driver in a ride-sharing service, a person desiring information about a rider pick-up location, or the like.

The system 100 further includes the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WIFI network, a WiMax network, another type of network, or a combination of two or more such networks.

The client device 110 accesses the various data and applications provided by other entities in the system 100 via a web client 112 (e.g., a browser, such as the Internet Explorer® browser developed by Microsoft® Corporation of Redmond, Wash.) or one or more client applications 114. The client device 110 includes the one or more client applications 114 (also referred to as "apps") such as, but not limited to, a web browser, a messaging application, an electronic mail (email) application, an e-commerce site application, a mapping or location application, a ride-sharing application, a navigation application, and the like.

In some embodiments, the one or more client applications 114 may be included in the client device 110, and configured to locally provide a user interface and at least some of the functionalities, with the client applications 114 configured to communicate with other components or entities in the system 100 (e.g., third-party servers 130, server system 102), on an as-needed basis, for data and/or processing capabilities not locally available (e.g., to access location information, to request a pickup or drop-off location, to access navigation information, to authenticate the user 106, to verify a method of payment). Conversely, the one or more client applications 114 may not be included in the client device 110, and the client device 110 may use its web browser to access the one or more applications hosted on other entities in the system 100 (e.g., third-party servers 130, server system 102).

The server system 102 provides server-side functionality via the network 104 (e.g., the Internet or a wide area network (WAN)) to one or more third-party servers 130 and/or one or more client devices 110. The server system 102 may include an application programming interface (API) server 120, a web server 122, and a location generation system 124, that are communicatively coupled with one or more databases 126.

The one or more databases 126 are storage devices that store data related to one or more of source code, navigation data, pick-up and drop-off locations, a nearest node to a destination location, mapping and location information related to local transmitters (e.g., Bluetooth low energy (BLE) beacons), and so forth. The one or more databases 126 may further store information related to the third-party servers 130, third-party applications 132, the client device 110, the client applications 114, the user 106, and so forth. The one or more databases 126 may be cloud-based storage.

The server system 102 is a cloud computing environment, according to some example embodiments. The server system 102, and any servers associated with the server system 102, are associated with a cloud-based application, in one example embodiment.

The location generation system 124 provides back-end support for the third-party applications 132 and the client applications 114, which may include cloud-based applications. The location generation system 124 determines a landmark or other point of interest that can be used to identify a location for pickup, drop-off, delivery, meeting up, or other scenario where a clearly identified location is desired, and using the landmark or other point of interest, creates a semantic label to provide for a location, as described in further detail below. The location generation system 124 comprises one or more servers or other computing devices or systems.

The system 100 further includes one or more third-party servers 130. The one or more third-party servers 130 comprise one or more third-party applications 132. The one or more third-party applications 132, executing on the third-party server(s) 130, interact with the server system 102 via a programmatic interface provided by the API server 120. For example, the one or more third-party applications 132 may request and utilize information from the server system 102 via the API server 120 to support one or more features or functions on a website hosted by a third party or an application hosted by the third party. In one example, a third-party application 132 may request and receive navigation data via the server system 102 and the location generation system 124.

Figure 2:
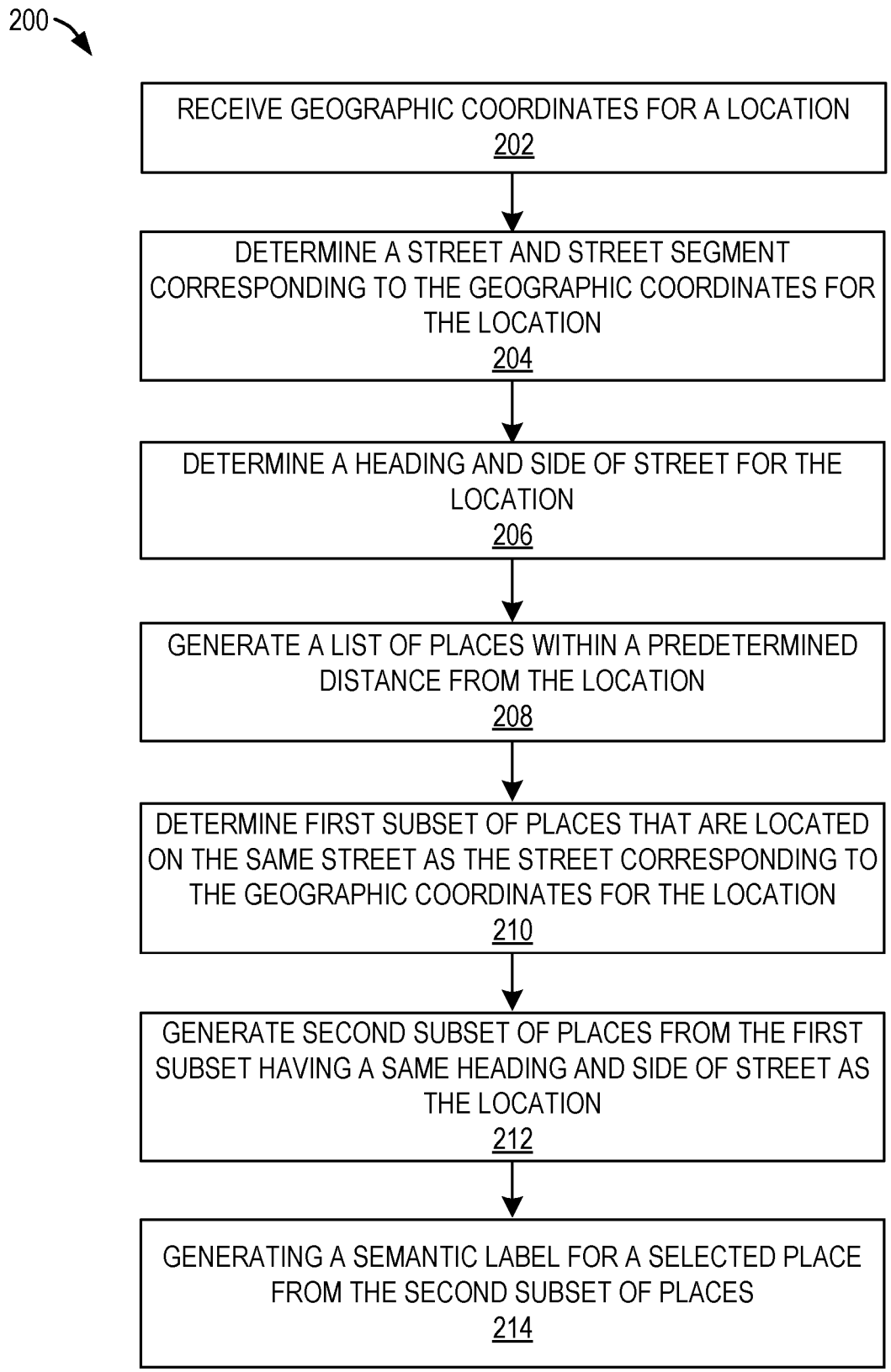
FIG. 2 is a flowchart illustrating aspects of a method, according to some example embodiments.

FIG. 2 is a flowchart illustrating aspects of a method 200, according to some example embodiments. For illustrative purposes, the method 200 is described with respect to the networked system 100 of FIG. 1. It is to be understood that the method 200 may be practiced with other system configurations in other embodiments.

In operation 202, one or more processors of a computing system (e.g., a server system, such as the server system 102 or the location generation system 124) receives geographic coordinates for a location. For example, the computing system receives the geographic coordinates (e.g., latitude/longitude) from a computing device such as client device 110. The computing device is equipped with GPS and/or related technology to detect geographic coordinates corresponding to a location of the computing device and send them to the computing system. In one example, the geographic coordinates are sent as part of a request for a pickup or drop-off location in a ride sharing scenario, a request for navigation instructions, a request for a pickup or drop off location in a delivery scenario (e.g., food delivery, package delivery), or other scenario where a location orientation is requested.

Figure 3:
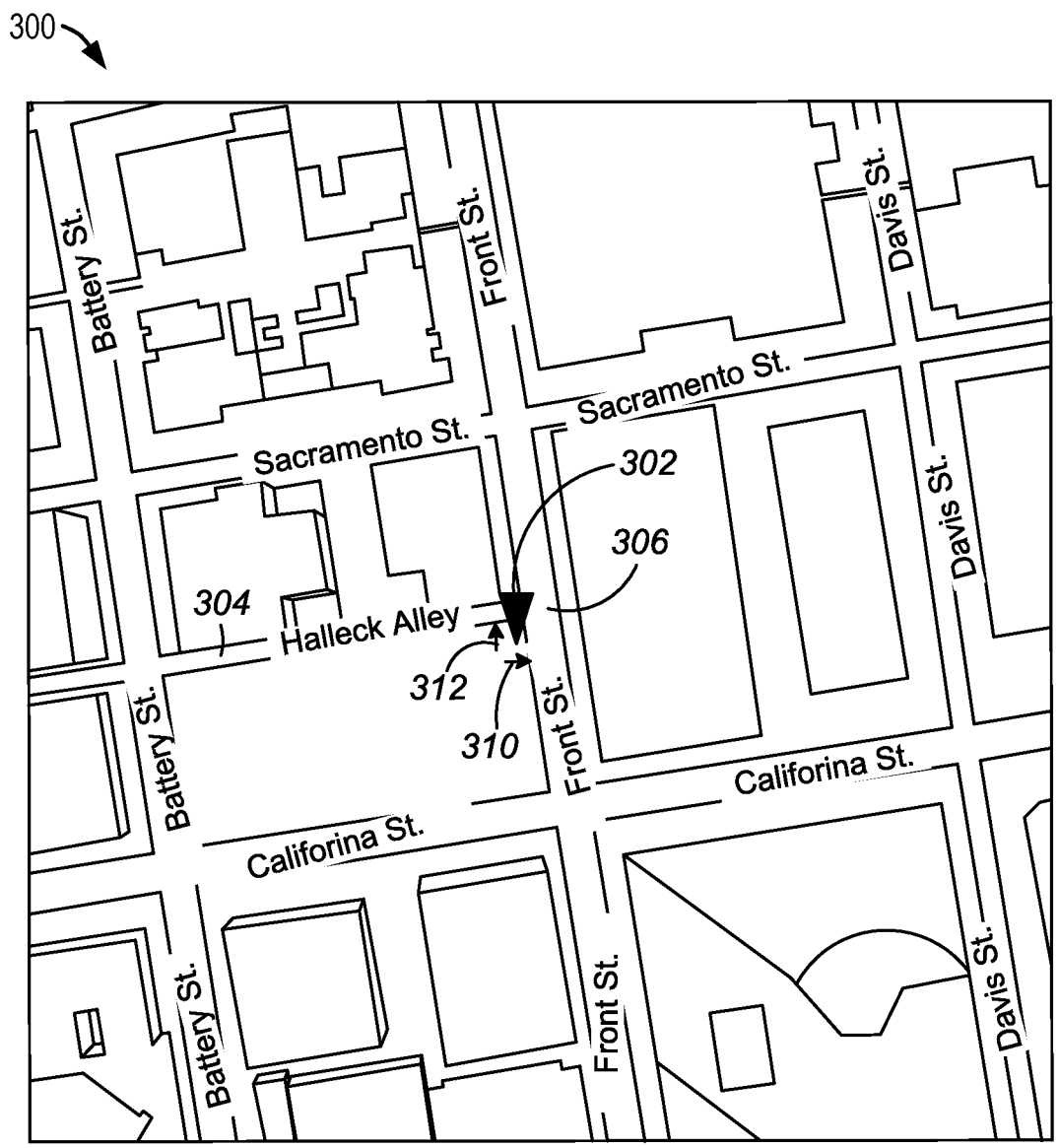
FIGS. 3-5 illustrate example maps, according to some example embodiments.

In operation 204, the computing system determines a street and a segment of the street corresponding to the geographic coordinates for the location. For example, FIG. 3 illustrates an example map 300 showing a representation of a location 302 corresponding to the received geographic coordinates (e.g., latitude/longitude) on the map 300. In this example, there are at least two streets, Front street 306 and Halleck Alley 304 that correspond to the location 302. In one example embodiment, the computing system determines the closest street to the location 302. For instance, the computing system calculates a distance 310 from the location 302 to the first street (Front street 306) and a distance 312 from the location 302 to the second street (Halleck Alley 304) and determines which street is the shortest distance from the location 302. In this example, Front Street 306 is the closest street to the geographical coordinates of the location and thus, the computing system sets Front Street as the street corresponding to the geographic coordinates for the location.

Figure 4:
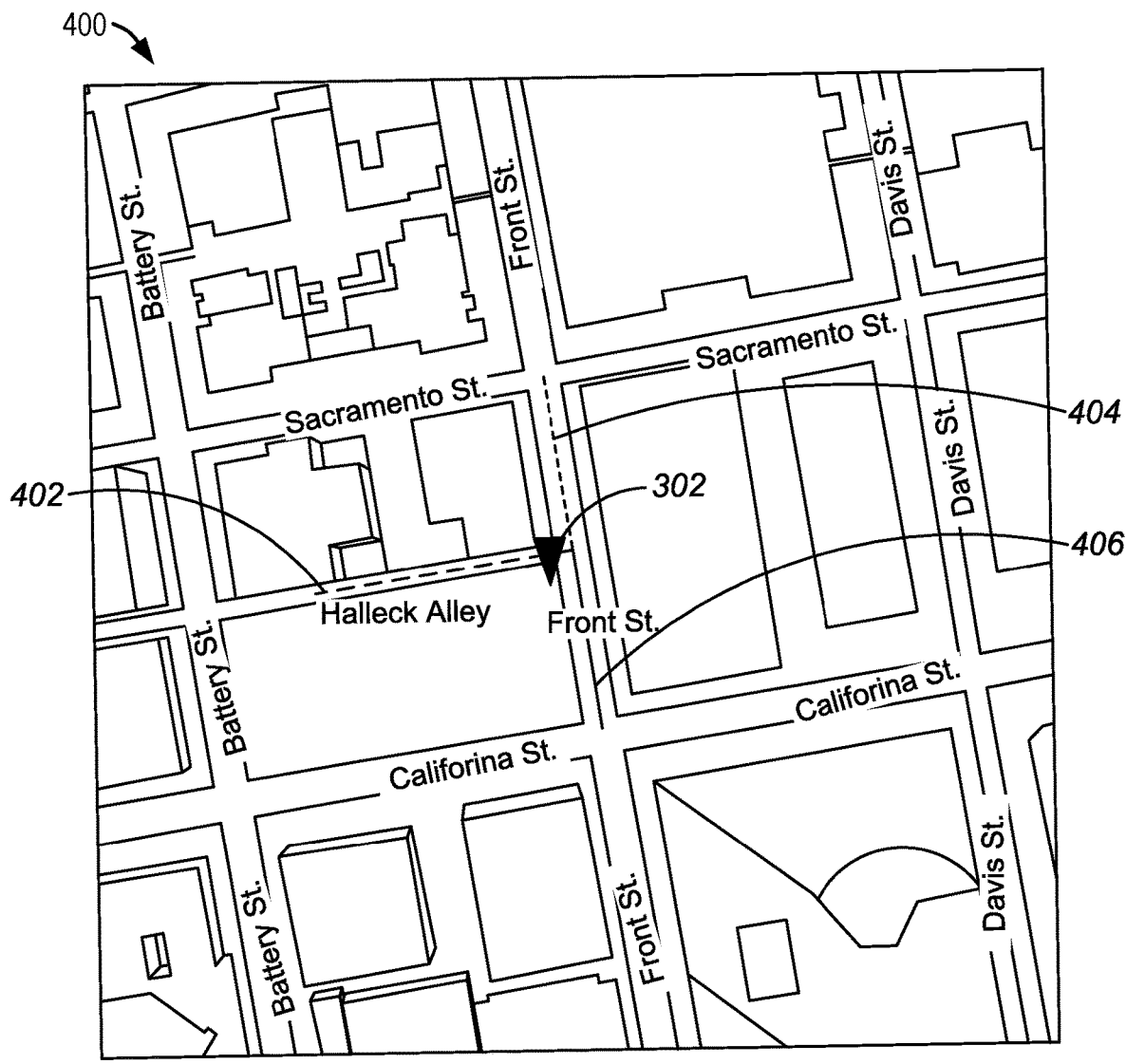

In one example embodiment, the computing system also determines a street segment corresponding to the geographic coordinates for the location. For example, a street is divided into segments to more accurately determine locations on a street. A street can be segmented at major blocks or by other means. FIG. 4 illustrates an example map 400 showing example street segments 402, 404, and 406, corresponding to the location 302. The computing system has already determined the street (e.g., Front Street in this example) corresponding to the geographic coordinates for the location 302, and thus, can determine the segment of Front Street that corresponds to the location. In this example, the location 302 corresponds to segment 406 which is the closest segment to the location 302.

Returning to FIG. 2, in operation 206, the computing system determines a heading and a side of the street for the location. The heading is the direction the street is heading. In the example map 300 of FIG. 3, Front Street 306 is a one-way street heading north. In the case where a street is a two-way street, it will have two headings (e.g., north and south, or east and west). The heading is used to determine a side of the street for the location (e.g., relative to the heading). For example, the location 302 in FIG. 3 is on a left side of the street that is facing north on a street that is heading north. So, in the example illustrated in FIG. 3, the heading for location 302 is north, and the side of the street for location 302 is a left-hand side. If the location 302 were on the opposite side of Front Street, the heading would be north, and the side of the street would be the right-hand side. This calculation can be further used to determine points of interest that are on the same side of the street or that are across the street, as explained further below.

Figure 5:
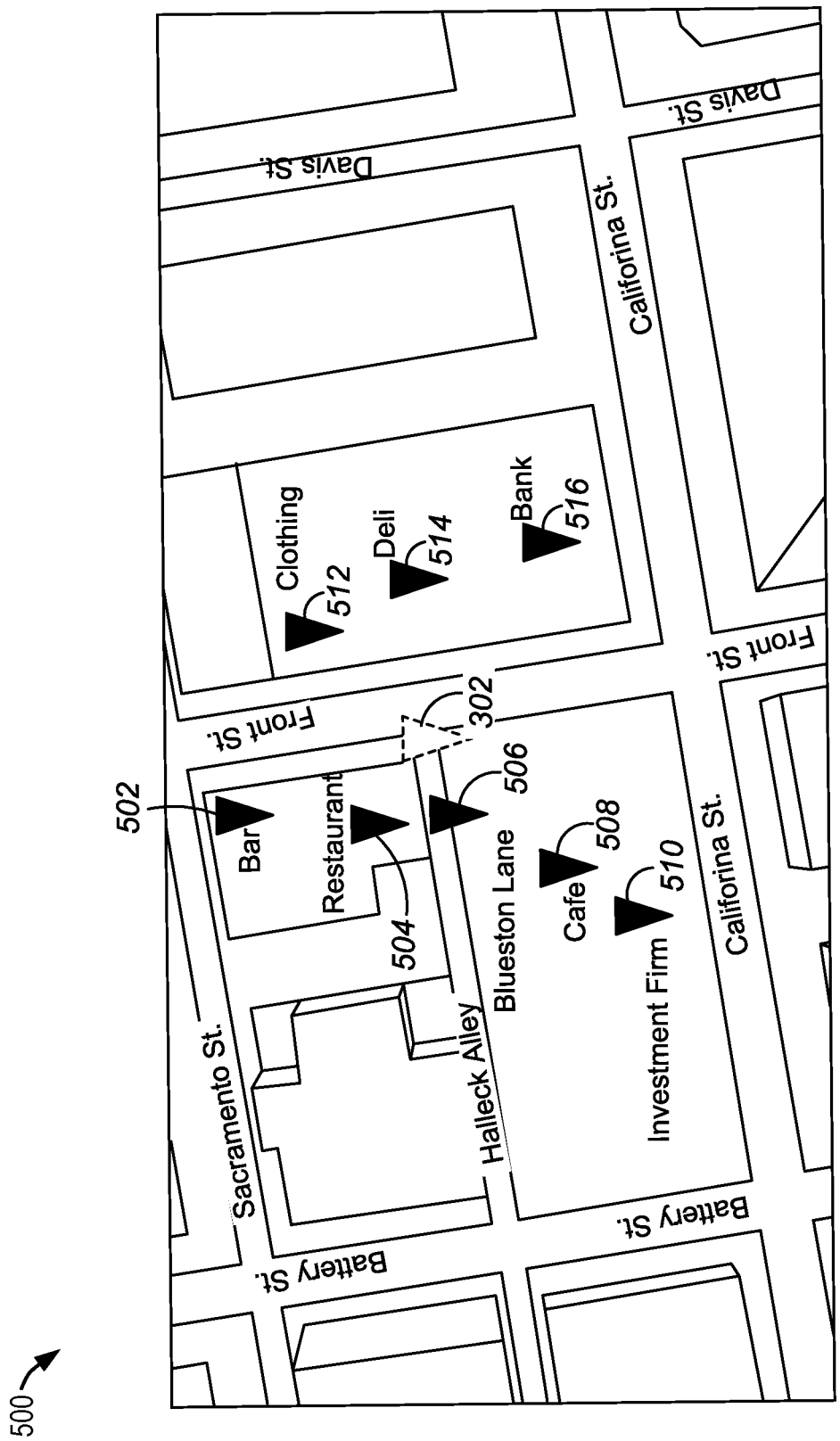

In operation 208, the computing system generates a list of places within a predetermined distance from the location (e.g., within a few blocks, within a quarter mile, within 200 meters, etc.). A place can be a landmark or other point of interest, such as a restaurant, park, mall, building, museum, airport, and the like. The computing system can generate the list of places within predetermined distance from the location by accessing one or more databases comprising place information and locations and searching for places with locations within the predetermined distance from the location. The place information may comprise a name of the place, an address of the place, geographic coordinates of the place, a place category, images corresponding to the place, and so forth. FIG. 5 illustrates an example map 500 with a list of places 502-516 within a predetermined distance from the location 302.

In one example embodiment, the list of places is a list of all the places with locations within the predetermined distance from the location. In another example, the list of places is a selected list of places, from all the places with locations within the predetermined distance from the location, based on one or more criteria such as a popularity measure of each of the places. For example, the computing system selects the places that are the most popular by trip volume, based on the number of trips that originated from the place and/or a number of trips that ended at the place. For instance, trip volume may indicate that a place is visible and/or accessible. The computing system may select the places based on a threshold popularity measure (e.g., a place associated with over a predetermined threshold number of trips originating from and/or ending at the place) and/or a threshold number of places to consider for the location (e.g., 5, 10, 20). It is to be understood that other factors (e.g., visibility, fame, ratings, places from invalid categories that are not points of interest, places with a popularity below a threshold number of riders (e.g., 25), places with less than a threshold number of unique riders (e.g., 5), etc.) in addition to or in alternative to popularity can be used to select the list of places within the predetermined distance from the location, in example embodiments.

In operation 210, the computing system determines a first subset of places of the list of places that are located on the same street as the street corresponding to the geographic coordinates for the location. For example, the address of the place can indicate where there is an entrance to the place and a visible sign or signboard for the place. If a place does not have an entrance or signboard on the same street as the location, the place is likely not visible from the location. This makes such a place a less desirable place for location orientation since a user (e.g., rider, driver, biker, pedestrian) at the location likely cannot see the entrance or signboard indicting the place, and thus, the place is not visible to the location and can be eliminated.

In one example embodiment, the computing system determines a street (e.g., street name) in an address for each place in the list of places. The computing system compares the street in the address for each place of the list of places to the street corresponding to the geographic coordinates for the place. The computing system selects a place to include in the first subset of places based on determining that the place has a street in the address substantially similar to the street corresponding to the geographic coordinates for the location. For example, the computing system determines that the address for each of place 508 and place 510 in FIG. 5 are on California Street. Thus, place 508 and place 510 are not included in the first subset of places that are located on the same street (e.g., Front Street). The computing system may determine that places 502-506 and 512-516, are located on the same street as the location.

Returning to FIG. 2, in operation 212, the computing system generates a second subset of places from the first subset of places having a same heading and side of the street as the heading and side of the street for the location. For example, the computing system determines a heading and side of the street for each place of the first subset of places in a same manner as described above for generating a heading and side of the street for the location. For example, the heading and side of the street for each of the places 502, 504, and 506 are north (heading) and left-hand side (side of the street) on the example map 500 of FIG. 5. The heading and side of the street for each of places 512, 514, and 516 are north (heading) and right-hand side (side of the street). Thus, the places 502, 504, and 506 are on the same side of the street as the location and are included in the second subset of places. The places 512, 514, and 516 are not on the same side of the street but are instead on the opposite side of the street, and thus can be eliminated. In one example, places located on the same side of the street are favored because they may be more visible to a user at the location and so that a user does not have to cross a street.

In one example embodiment, the computing system filters out places from the second subset of places that are located across a street from the segment of the street corresponding to the geographic coordinates for the location (e.g., where there is a street in between the location (e.g., user) and the place). For example, it may be easier (and safer) if a user at the location does not have to cross any street. As can be seen in FIG. 4, the segment 406 of the street for the location is the section of Front Street between California Street and Halleck Alley. In FIG. 5 it can be seen that places 502 and 504 are across a street (Halleck Alley) from the location. Accordingly, in one example embodiment, places 502 and 504 are eliminated.

The computing system generates a final list of places to select from for location orientation. The final list of places can be the second subset of places or the filtered second subset of places that excludes places across a street from the location (e.g., places 502 and 504). The computing system selects one place of the final list of places. In the example described in reference to FIG. 5 there is only one place in the final list of places (e.g., 506). Thus, the computing system chooses place 506. In other examples there may be more than one place in the final list of places. The computing system can select one of the places based on popularity, such as based on trip volume (e.g., based on the number of trips that originated from the place or a number of trips that ended at the place) as explained above. In addition, or in the alternative, the computing system can select the one place based on distance to the location, visibility, or other criteria.

As another example, the computing system can select the one place based on a category of place. For example, if a place is categorized as a business building it may be less visible or obvious (e.g., in terms of a more visible signage) than a chain coffee shop (e.g., Starbucks) or drugstore (e.g., Walgreens), or a restaurant or grocery store, for example. Thus, a place categorized as a more visible type of place (e.g., coffee shop) may be selected over a less visible type of place (e.g., business building). In one example, the places may be categorized in level of prominence, such as a high prominence (e.g., temples, universities, transit stations), medium prominence (banks, parks), and low prominence (e.g., places not categorized as high or medium prominence.).

In one example embodiment, the computing system selects a place based on distance and popularity. For example, if two places are within a threshold distance (e.g., 25 meters) of a location but one place is more popular (e.g., based on a number of trips that originated from or ended at the place), the more popular place may be selected, even if the more popular place is farther than the less popular place. For example, place A is 5 meters from the location and has a popularity of 10 while place B is 30 meters from the location and has a popularity of 500. In this example, place B is selected even though it is farther in distance because it is much more popular, indicating it is a better place to use for location orientation. In another example, if place C and D are similar in popularity (e.g., 100 and 110 respectively) but place C is 5 meters away and place D is 30 meters away, place C may be selected since it is closer and the popularity is similar for the two places.

In one example embodiment, the computing system selects a place based on popularity, category (e.g., level of prominence), and distance. In one example, each of the factors (e.g., popularity, category, distance) is weighted to generate a final rank for a place and a highest ranked place is selected. It is to be understood that these are just examples of how certain factors can be used to select a place and that a single factor or different combinations of factors can be used in example embodiments.

Referring again to FIG. 2, in operation 214, the computing device generates a semantic label for the selected place. A semantic label is a human recognizable string that references a recognizable place in the real world to help a user (e.g., rider or driver) orient herself or himself to a location (e.g., on a map). In one example embodiment, the semantic label comprises the name of the place. In another example embodiment, the semantic label comprises a name of the place and a street name.

Figure 6:
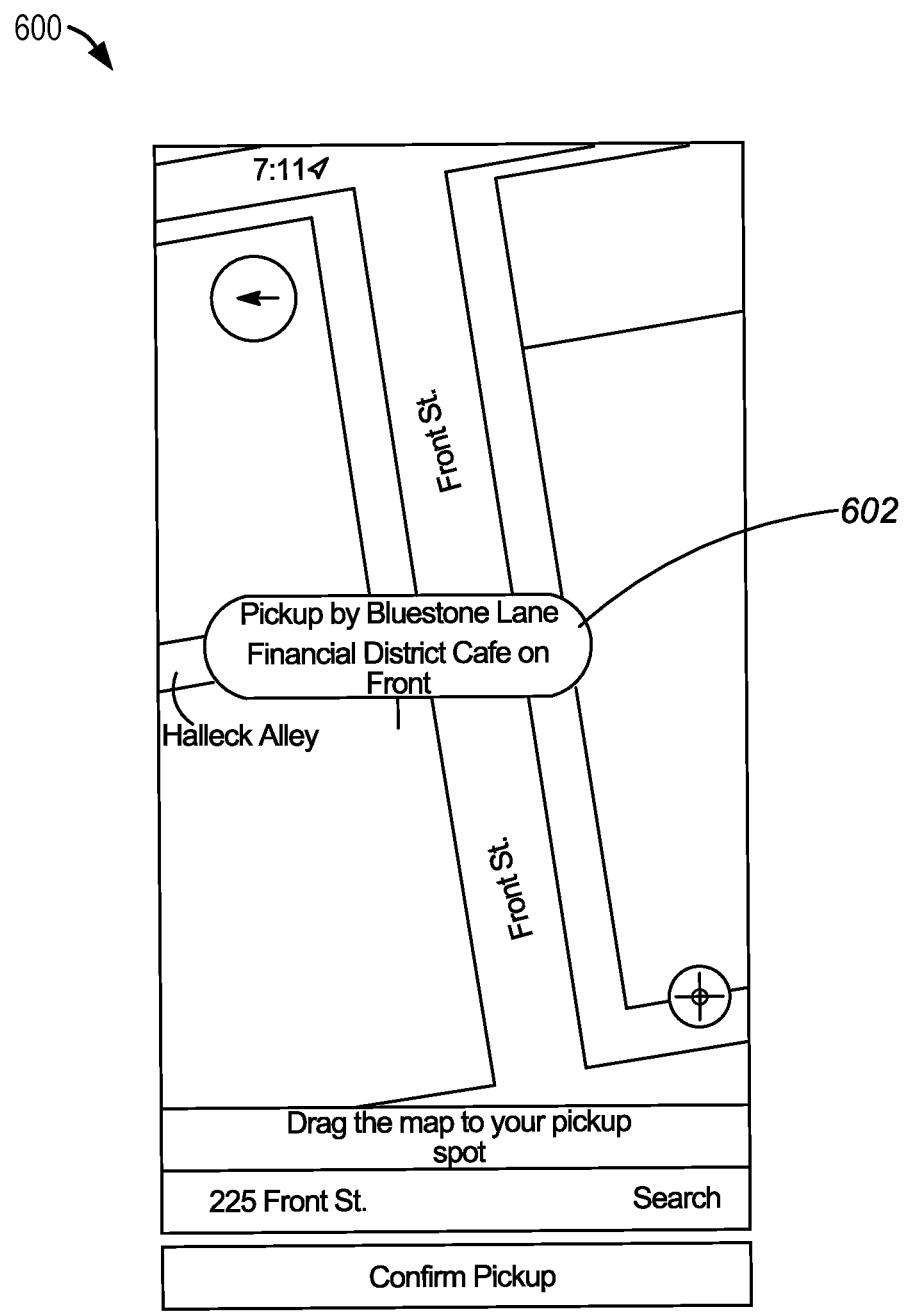
FIG. 6 illustrates an example display, according to some example embodiments.

The semantic label can be provided to a computing device (e.g., the requesting computing device) to be displayed on a display of the computing device. FIG. 6 illustrates an example display 600 that shows a notification 602 including the semantic label ("Bluestone Lane Financial District Café on Front) and additional instructions (e.g., "pickup by") in a rider sharing scenario that indicates a pickup location for a rider.

Figure 7:
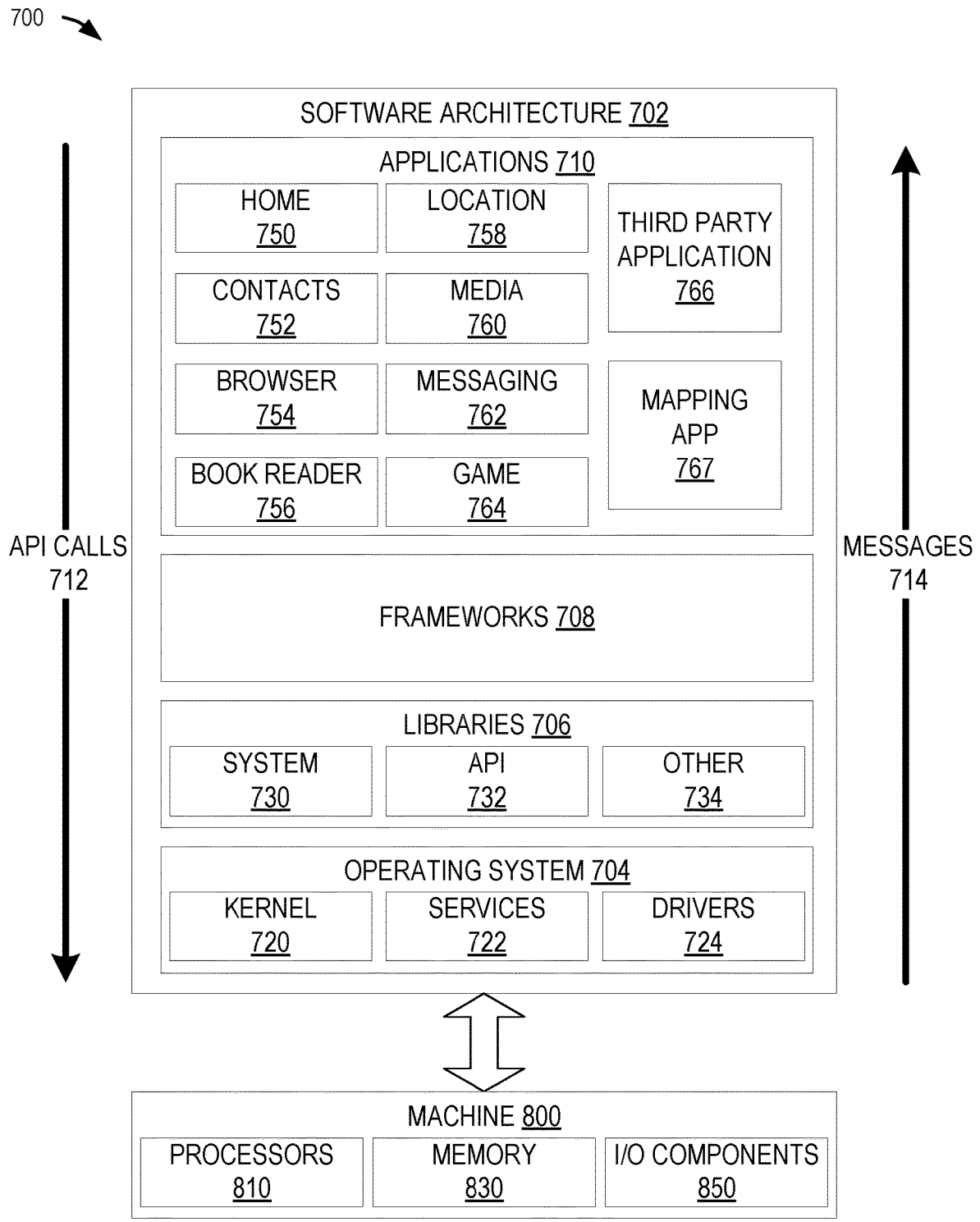
FIG. 7 is a block diagram illustrating an example of a software architecture that may be installed on a machine, according to some example embodiments.

FIG. 7 is a block diagram 700 illustrating a software architecture 702, which can be installed on any one or more of the devices described above. For example, in various embodiments, client devices 110 and servers and systems 130, 102, 120, 122, and 124 may be implemented using some or all of the elements of the software architecture 702. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WIFI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematical functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Some embodiments may particularly include a mapping application 767. In certain embodiments, this may be a standalone application that operates to manage communications with a server system such as third-party servers 130 or server system 102. In other embodiments, this functionality may be integrated with another application (e.g., a ridesharing, asset location, or navigation application). The mapping application 767 may request and display various data related to mapping and navigation and may provide the capability for a user 106 to input data related to the objects via a touch interface, via a keyboard, or using a camera device of the machine 800; communicate with a server system via the I/O components 850; and receive and store object data in the memory 830. Presentation of information and user inputs associated with the information may be managed by the mapping application 767 using different frameworks 708, library 706 elements, or operating system 704 elements operating on the machine 800.

Figure 8:
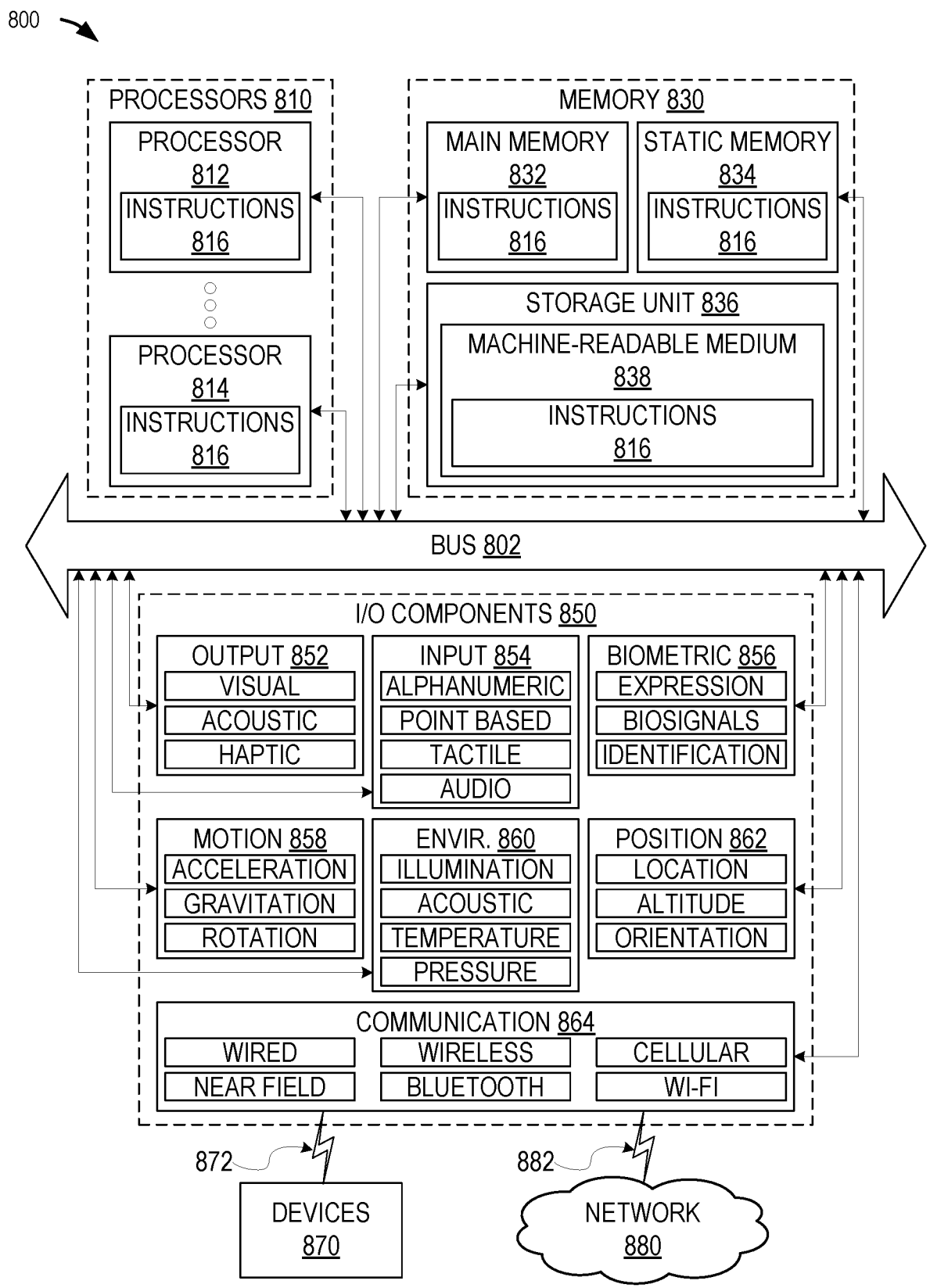
FIG. 8 illustrates a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or system 130, 102, 120, 122, 124, etc., or a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions, when executed by one or more processors of the machine (e.g., the processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FT® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D barcodes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of wellknown transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving, by one or more hardware processors of a computing system, geographic coordinates for a location;
   determining a street corresponding to the geographic coordinates for the location and a segment of the street corresponding to the geographic coordinates for the location;
   determining a heading and a side of the street for the location;
   generating a list of places within a predetermined distance from the location;
   determining a first subset of places of the list of places that are located on the same street as the street corresponding to the geographic coordinates for the location;
   generating a second subset of places from the first subset of places, each place of the second subset of places having a same heading and side of the street as the heading and side of the street for the location;
   filtering out places from the second subset of places that are located across a street from the segment of the street corresponding to the geographic coordinates for the location to generate a final list of places;
   selecting a place from the final list of places; and
   generating a semantic label for the selected place.

2. The method of claim 1, wherein determining the street corresponding to the geographic coordinates for the location comprises:
   determining a street closest in distance to the geographic coordinates for the location; and
   setting the street closest in distance to the geographic coordinates for the location as the street corresponding to the geographic coordinates for the location.

3. The method of claim 1, wherein determining the first subset of places of the list of places that are located on the same street as the street corresponding to the geographic coordinates for the location comprises:
   determining a street in an address for each place of the list of places;
   comparing the street in the address for each place of the list of places to the street corresponding to the geographic coordinates for the location; and
   selecting a place to include in the first subset of places based on determining that the place has a street in the address similar to the street corresponding to the geographic coordinates for the location.

4. The method of claim 1, wherein the selected place is selected based on popularity of the selected place.

5. The method of claim 4, wherein the popularity of the selected place is based on at least one of a number of trips that originated from the selected place or a number of trips that ended at the selected place.

6. The method of claim 1, wherein the semantic label includes a name of the selected place.

7. The method of claim 1, wherein the semantic label includes a name of the selected place and a street name of the selected place.

8. The method of claim 1, wherein the semantic label is displayed on a display of a computing device to indicate a pickup or drop-off location.

9. A computing system comprising:
   a memory that stores instructions; and one or more processors configured by the instructions to perform operations comprising:
receiving geographic coordinates for a location;
determining a street corresponding to the geographic coordinates for the location and a segment of the street corresponding to the geographic coordinates for the location;
determining a heading and a side of the street for the location;
generating a list of places within a predetermined distance from the location;
determining a first subset of places of the list of places that are located on the same street as the street corresponding to the geographic coordinates for the location;
generating a second subset of places from the first subset of places, each place of the second subset of places having a same heading and side of the street as the heading and side of the street for the location;
filtering out places from the second subset of places that are located across a street from the segment of the street corresponding to the geographic coordinates for the location to generate a final list of places;
selecting a place from the final list of places; and
generating a semantic label for the selected place.

10. The computing system of claim 9, wherein determining the street corresponding to the geographic coordinates for the location comprises:
determining a street closest in distance to the geographic coordinates for the location; and
setting the street closest in distance to the geographic coordinates for the location as the street corresponding to the geographic coordinates for the location.

11. The computing system of claim 9, wherein determining the first subset of places of the list of places that are located on the same street as the street corresponding to the geographic coordinates for the location comprises:
determining a street in an address for each place of the list of places;
comparing the street in the address for each place of the list of places to the street corresponding to the geographic coordinates for the location; and
selecting a place to include in the first subset of places based on determining that the place has a street in the address similar to the street corresponding to the geographic coordinates for the location.

12. The computing system of claim 9, wherein the selected place is selected based on popularity of the selected place.

13. The computing system of claim 12, wherein the popularity of the selected place is based on at least one of a number of trips that originated from the selected place or a number of trips that ended at the selected place.

14. The computing system of claim 9, wherein the semantic label includes a name of the selected place.

15. The computing system of claim 9, wherein the semantic label includes a name of the selected place and a street name of the selected place.

16. The computing system of claim 9, wherein the semantic label is displayed on a display of a computing device to indicate a pickup or drop-off location.

17. A non-transitory computer-readable medium comprising instructions stored thereon that are executable by at least one processor to cause a computing system to perform operations comprising:
receiving geographic coordinates for a location;
determining a street corresponding to the geographic coordinates for the location and a segment of the street corresponding to the geographic coordinates for the location;
determining a heading and a side of the street for the location;
generating a list of places within a predetermined distance from the location;
determining a first subset of places of the list of places that are located on the same street as the street corresponding to the geographic coordinates for the location;
generating a second subset of places from the first subset of places, each place of the second subset of places having a same heading and side of the street as the heading and side of the street for the location;
filtering out places from the second subset of places that are located across a street from the segment of the street corresponding to the geographic coordinates for the location to generate a final list of places;
selecting a place from the final list of places; and
generating a semantic label for the selected place.

18. The non-transitory computer-readable medium of claim 17, wherein determining the street corresponding to the geographic coordinates for the location comprises:
determining a street closest in distance to the geographic coordinates for the location; and
setting the street closest in distance to the geographic coordinates for the location as the street corresponding to the geographic coordinates for the location.

19. The non-transitory computer-readable medium of claim 17, wherein determining the first subset of places of the list of places that are located on the same street as the street corresponding to the geographic coordinates for the location comprises:
determining a street in an address for each place of the list of places;
comparing the street in the address for each place of the list of places to the street corresponding to the geographic coordinates for the location; and
selecting a place to include in the first subset of places based on determining that the place has a street in the address similar to the street corresponding to the geographic coordinates for the location.

20. The non-transitory computer-readable medium of claim 17, wherein the selected place is selected based on popularity of the selected place and wherein the popularity of the selected place is based on at least one of a number of trips that originated from the selected place or a number of trips that ended at the selected place.

* * * * *